United States Patent [19]
Chludek et al.

[11] Patent Number: 5,122,102
[45] Date of Patent: Jun. 16, 1992

[54] DIFFERENTIAL DRIVE

[75] Inventors: Adrian Chludek, St. Augustin; Wolfgang Hildebrandt, Lohmar, both of Fed. Rep. of Germany

[73] Assignee: Viscodrive GmbH, Lohmar, Fed. Rep. of Germany

[21] Appl. No.: 690,538

[22] Filed: Apr. 23, 1991

[30] Foreign Application Priority Data

Apr. 25, 1990 [DE] Fed. Rep. of Germany ....... 4013197

[51] Int. Cl.⁵ .............................................. F16H 1/44
[52] U.S. Cl. ..................... 475/252; 475/249
[58] Field of Search ...................... 475/252, 248, 249

[56] References Cited

U.S. PATENT DOCUMENTS

| | | | |
|---|---|---|---|
| 1,203,085 | 10/1916 | Wallace | 475/252 X |
| 3,060,765 | 10/1962 | Rinsoz | 475/252 |
| 3,375,736 | 4/1968 | Saari | 475/252 |
| 3,738,192 | 6/1973 | Belansky | 475/252 X |

Primary Examiner—Richard Lorence
Assistant Examiner—William O. Trousdell
Attorney, Agent, or Firm—Harness, Dickey & Pierce

[57] ABSTRACT

A differential drive having a drive housing in which a drivable differential carrier is rotatably supported and which comprises straight-toothed and helically toothed output gears connected to each other via differential gears which are axis-parallel thereto and of which a first group engages the one output gear and a second group the other output gear, with each of the differential gears of the one group engaging at least one of the differential gears of the outer group and with the differential gears, with their tooth heads, being held in partially cylindrical apertures of the differential carrier, with the axial length of at least some of said apertures being greater than the toothed region of the group of differential gears held therein, and with the apertures whose axial length is greater than that of the toothed region of the differential gears containing disc-shaped stop elements which extend radially inwardly beyond the inner cross-section of the apertures and which are axially supported on at least one of the output gears.

24 Claims, 5 Drawing Sheets

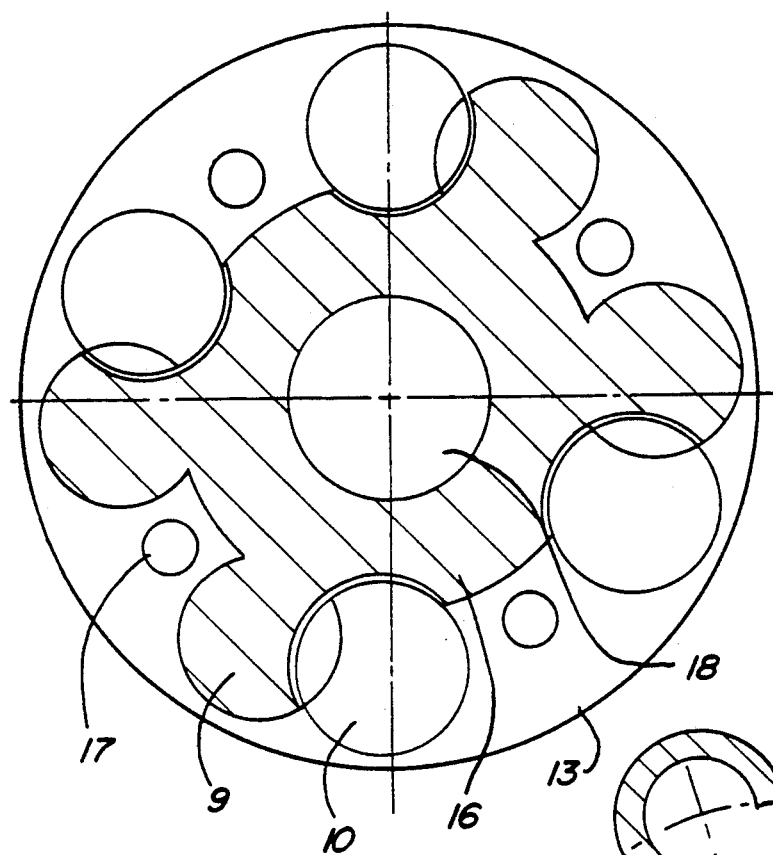
*Fig-3*
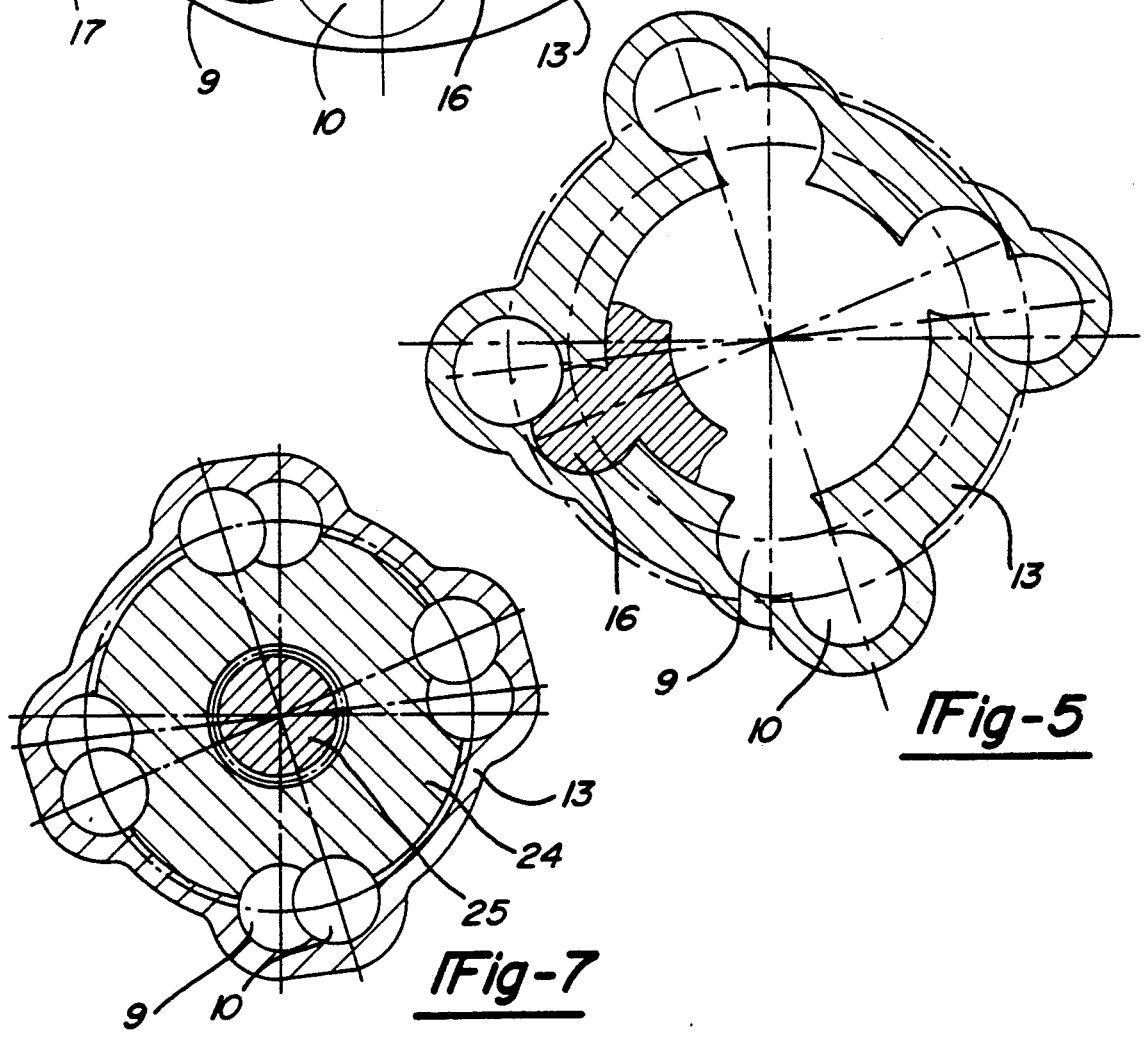
*Fig-5*
*Fig-7*

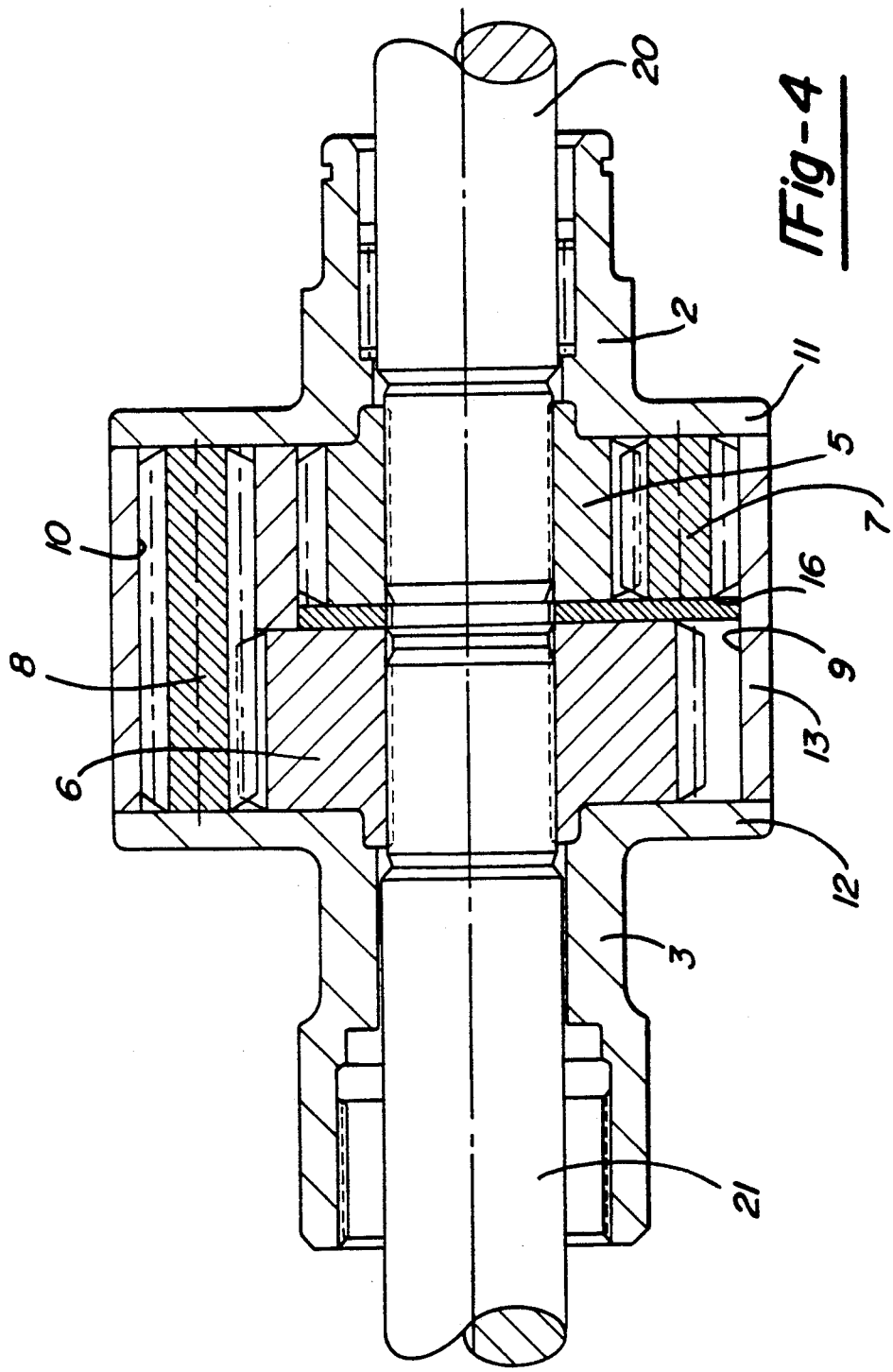

DIFFERENTIAL DRIVE

DESCRIPTION

The invention relates to a differential drive having a drive housing in which a drivable differential carrier is rotatably supported and which comprises straight-toothed or helically toothed output gears connected to each other via differential gears which are axis-parallel thereto and of which a first group engages the one output gear and a second group engages the other output gear, with each of the differential gears of the one group engaging at least one of the differential gears of the other group and with the differential gears, with their tooth heads, being held in partially cylindrical apertures of the differential carrier, with the axial length of at least part of said apertures being greater than the toothed portion of the group of differential gears held therein.

Such differential drives, when designed symmetrically, are used as axle differentials and, especially with an asymmetrical output gear design accompanied by an uneven torque distribution, they are used as central differentials in four wheel drive vehicles. A limited slip effect is achieved as a result of the friction of the differential gears on the tooth heads and, in the case of helically toothed gears, as a result of the friction on the end faces of the output and differential gears.

Such drives are known from DE-PS 35 30 244 and DE-OS 37 07 872 in the case of which the apertures for the differential gears are bored as blind holes from one end of the drive carrier and are closed unilaterally by a cover. The length of the differential gears is identical to that of the blind holes, with the differential gears engaging the rear output gear (viewed in the direction of machining) the blind holes being toothed only along part of their length while having an extension journal for permitting support on the cover of the differential carrier. The disadvantage of such a design is that even with differentials with a symmetrical torque distribution it is necessary to provide different differential gears and that the total weight is increased by the journal extensions.

It is the object of the present invention to simplify the design and reduce the weight of the said differentials which may also be designed as differentials with an asymmetrical torque distribution. The objective is achieved in that the apertures whose axial length is greater than that of the toothed portion of the differential gears contain disc-shaped stop elements which extend radially inwardly beyond the inner cross-section of the apertures and which are axially supported on at least one of the output gears. At their opposite border such stop elements are preferably held by the other output gear or parts of the carrier or spacers supported thereon.

In this way, the above-mentioned disadvantages are overcome. Preferably there are inserted simple stop elements which do not require any special additional fixing means, which permit differential gears whose length corresponds to that of the tooth engagement and which, in the differential carrier, border weight-reducing hollow spaces. The respective disc-shaped elements are easily produced as punched parts. Production of the apertures for the differential gears designed as through-apertures may be simplified in that, for example, a profiled blank is finish-machined by broaching. The blank in question may be produced by casting, sintering, hammering or extrusion molding and especially by continuous extrusion if large production quantities are involved. Whereas the said design including through-apertures for the differential gears fully utilises the advantages of the invention, a simpler design is such that there are provided blind holes bored from one end and having either an identical depth or different depths, with, in the latter case, only one of the said disc-shaped elements being used. The open housing ends may be closed by covers. These may either be bolted or welded on.

Preferred embodiments are illustrated in the drawings wherein

FIG. 1b shows a modified design of a differential carrier similar to that illustrated in FIG. 1a.

FIG. 1c shows a modified design of a differential carrier similar to that illustrated in FIG. 1a.

FIG. 3 is a cross-section through a stop disc according to FIGS. 1a to 1c.

FIG. 4 shows a differential carrier in accordance with the invention, having an uneven torque distribution.

FIG. 5 is a cross-section through a differential carrier according to FIG. 4.

FIG. 7 is a cross-section through a differential carrier according to FIG. 6.

Figure 1A:
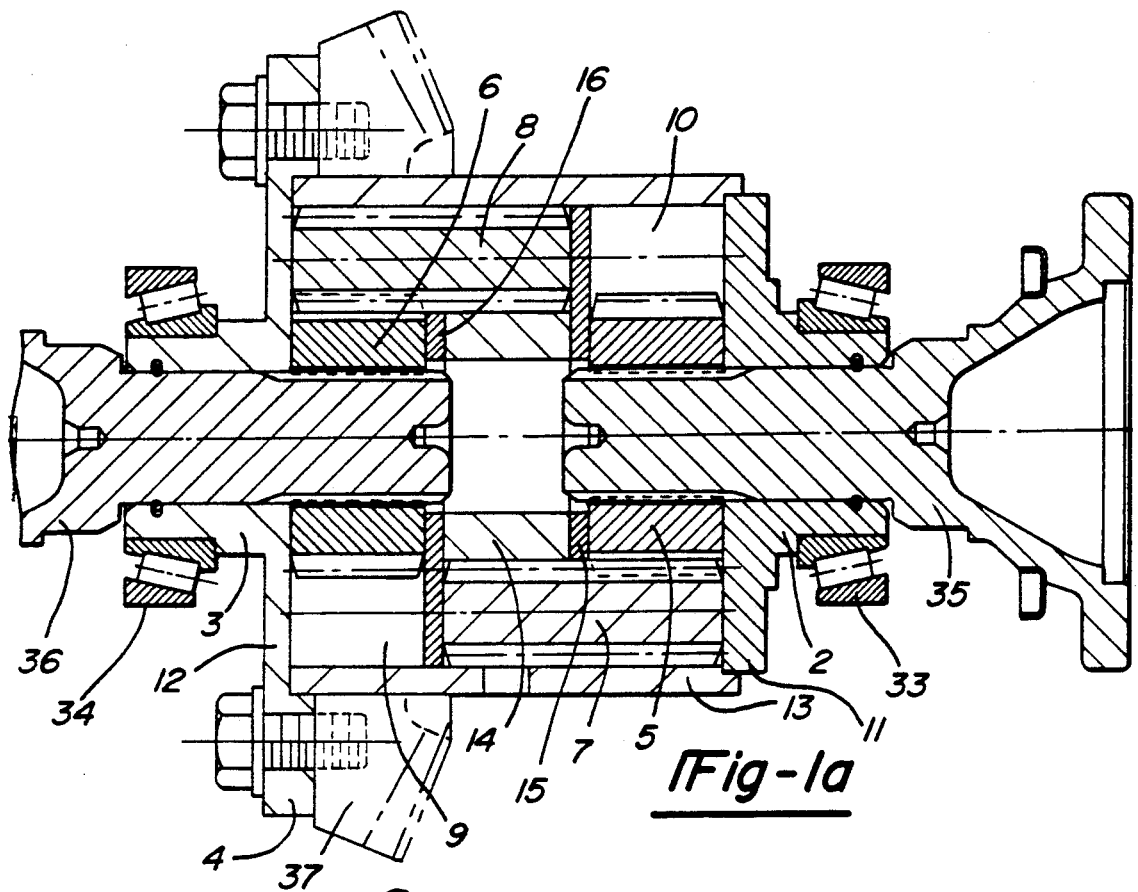
FIG. 1a is a longitudinal section through a preferred embodiment of a differential carrier of a drive in accordance with the invention.
Figure 1B:
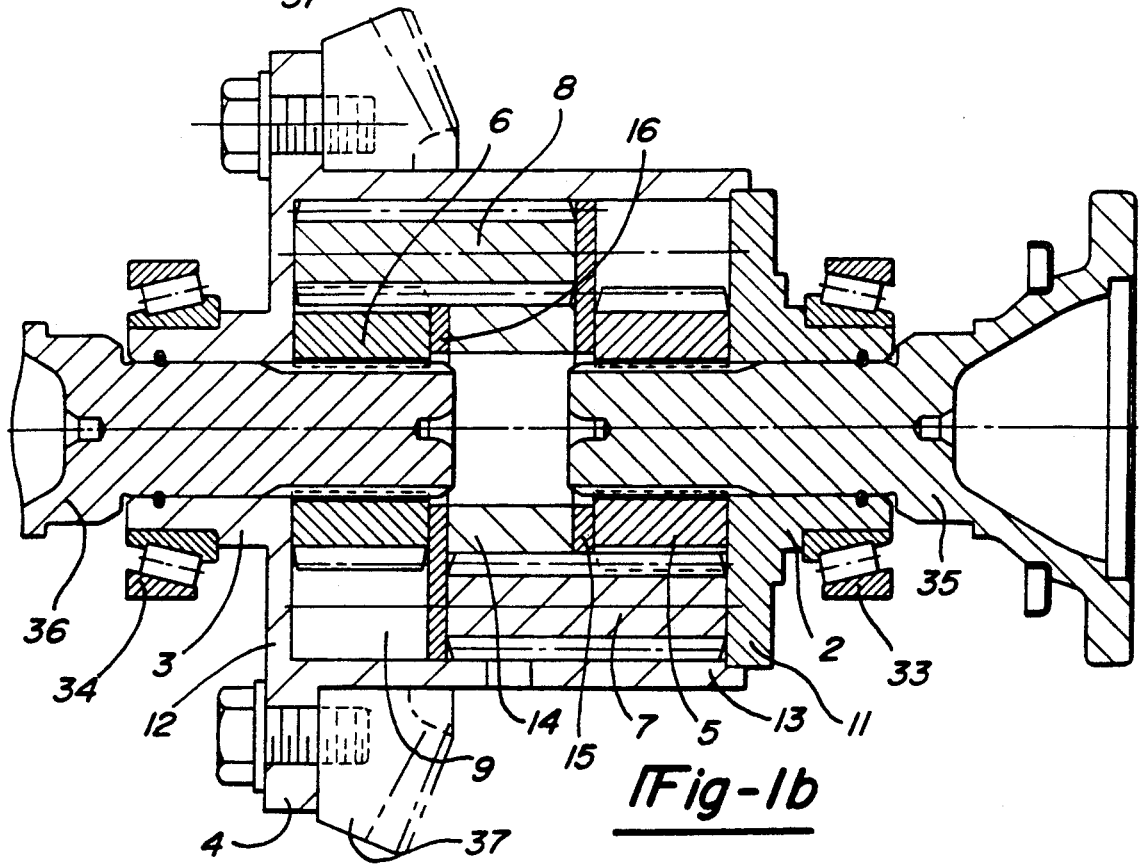
Figure 1C:
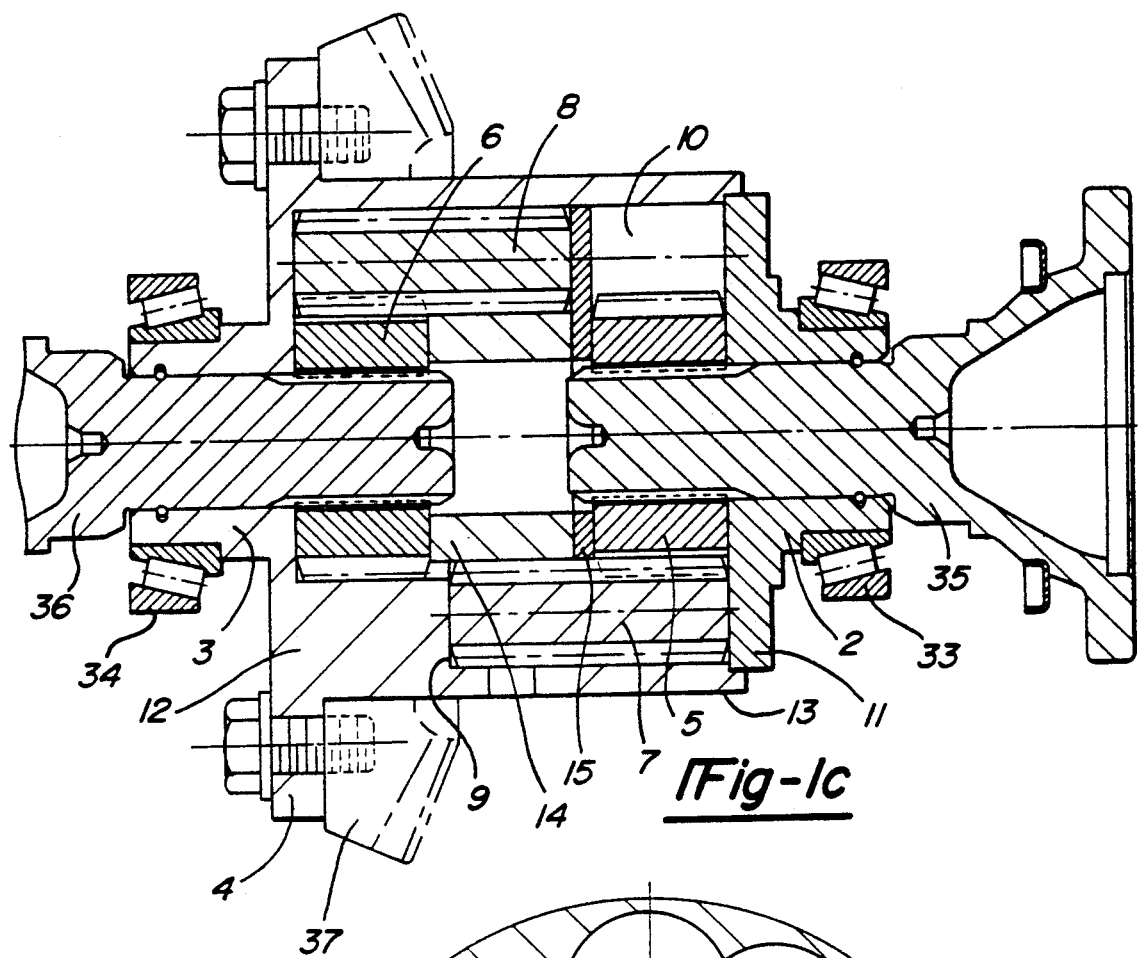

FIGS. 1a to 1c show the differential carrier 1 which, at both ends, comprises projections 2, 3 for receiving bearings 33, 34 relative to the differential housing and which is provided with a flange 4 for fixing a crown wheel 37. In the differential carrier there are held coaxial output gears 5, 6 which, outwardly, are supported on parts of the carrier and which, axially inwardly, support each other indirectly via a spacing sleeve 14. The spacing sleeve may also be substituted by a part which is integral with the differential carrier. Axially outwardly, the output gears 5, 6 are supported on cover and bottom parts of the differential carrier 1. Output shafts 35, 36 are inserted into the output gears 5, 6. The first output gear is engaged by a group of first axis-parallel differential gears 7 only one of which is illustrated in the form of a longitudinal section and which, in a circumferentially distributed way, engage the output gear 5. The output gear 6 is engaged by a second group of axis-parallel differential gears 8 one of which is illustrated and which, in a circumferentially distributed way, engage the output gear 6. The differential gears 7, 8 mutually engage each other at least in pairs and are held in apertures 9, 10 of which at least the latter extend along the entire housing length between the covers. Both the output gears 5, 6 and the differential gears 7, 8 are supported axially outwardly on cover parts 11, 12 of the differential carrier 1 which comprises a central part 13 of uniform cross-section. In FIG. 1a, the cover parts 11, 12 are separate from the central part 13 and attached thereto; in FIGS. 1b and 1c the cover part 11 is attached to the central part 13 in the usual way whereas the second cover or bottom part 12 is integral with the central part 13.

The output gears 5, 6 are supported inwardly relative to each other indirectly via a coaxial spacer 14 and two disc elements 15, 16 which have yet to be described in more detail and which at the same time limit the axial length of the recesses 9, 10 for the differential gears 7, 8. With its region extending inwardly beyond the apertures 9, 10, each of the elements to FIGS. 1a and 1b is axially held between an output gear and the spacer 14. Only in the design to FIG. 1c where the cover or bottom part 12 is designed to be integral with the outer housing part 13, is the aperture 9 for the differential gear 7 designed to be shorter so that the latter is supported directly on the end wall of said aperture, with one of the disc elements 15 being provided for only axially supporting the differential gear 8 in the opposite direction.

Figure 2:
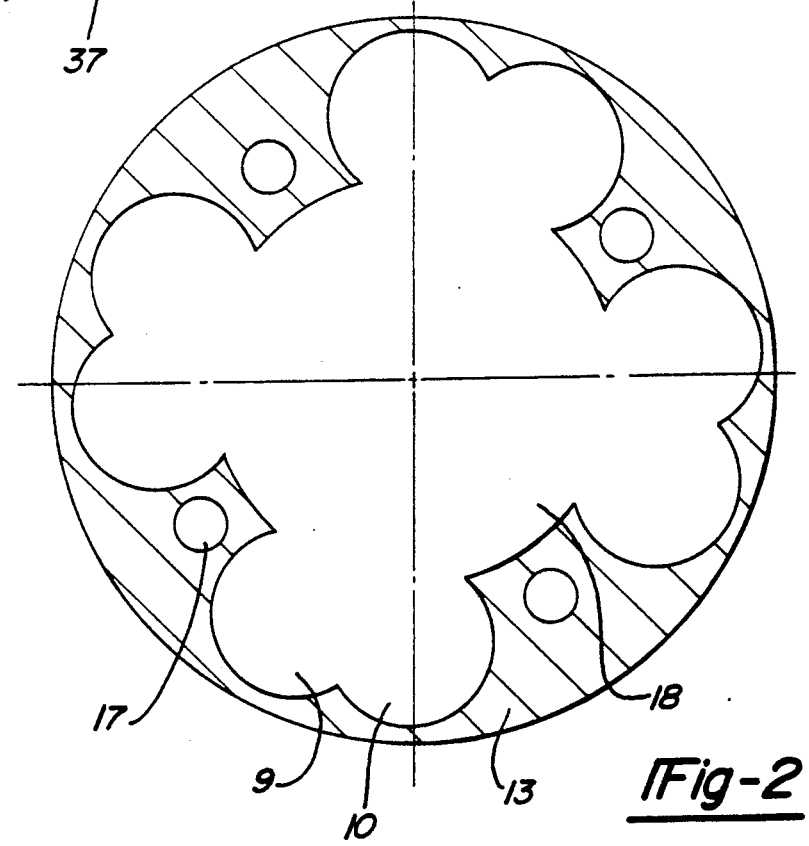
FIG. 2 is a cross-section through the central housing part according to FIGS. 1a to 1c.

FIG. 2 shows a cross-section through the differential carrier in the region of the central part 13, with a central circular recess 18 being provided for one of the output gears or the spacer 14, with recesses 9, 10 for the differential gears being in connection with the circular recess 18 so as to be circumferentially distributed and overlapping in pairs in the example illustrated. Furthermore, the housing has been provided with through-apertures 17 for fixing at least one of the covers according to FIGS. 1a to 1c.

FIG. 3 again shows a central housing part 13 including the details as illustrated in FIGS. 1a, 1b, with the cross-section showing a disc element 16 engaging the through-aperture 9. The regions for the shape of the through-apertures 10 corresponding to the second differential gears 8 have been removed from the disc elements 16. FIG. 4 shows the differential carrier of a drive with an uneven torque distribution, which carrier consists of a central part 13 and two cover parts 11, 12. The said drive comprises a first smaller output gear 5 and a second larger output gear 6. The output gear 5 is engaged by one of several circumferentially distributed differential gears 7 whose through-aperture 9 extending along the entire length of the central part 13 is limited by a disc element 16. The differential gear 8 which engages the larger output gear 6 and of which there are provided several so as to be circumferentially distributed extends along the entire length of the central housing part 13 and is axially held directly by the two cover parts 11, 12. The disc element 16 is positioned directly between the two output gears 5, 6. Shafts 20, 21 supported in projections 2, 3 at the cover parts 11, 12 are inserted into the output gears 5, 6. The drive of the differential carrier may be effected especially at one of the cover parts 11, 12.

FIG. 5 shows a cross-section of the central portion 13 of the differential carrier with recesses 9 for the differential gears 7 engaging the smaller output gears and recesses 10 for the differential gears 8 engaging the larger output gears. The disc-shaped element 16 which closes the apertures 9 for axially securing the first-mentioned differential gears is shown partially.

Figure 6:
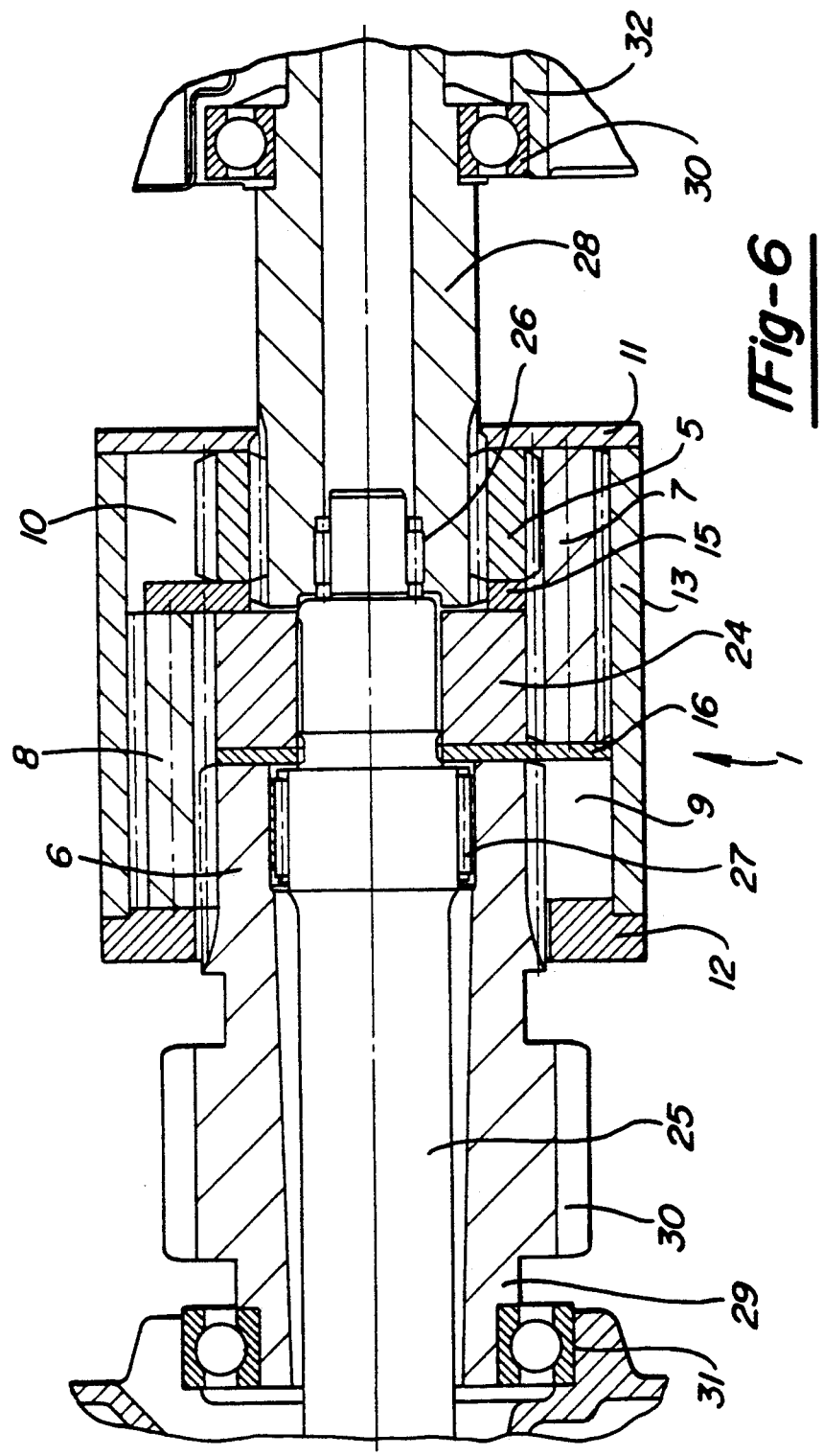
FIG. 6 shows a differential carrier in accordance with the invention, having an even torque distribution.

FIG. 6 illustrates a differential carrier of a drive similar to that shown in FIG. 4, with the differential carrier consisting of a central portion 13 and two covers 11, 12 positioned thereon. The drive of the differential carrier is effected via a centre piece 24 which is non-rotatingly connected to the central portion 13 of the differential carrier 1 and into which a shaft 25 is inserted so as to be non-rotating fastened thereto. Hollow shafts 28, 29 of which the first one carries the output gear 5 with the second one being designed to be integral with the output gear 6 are supported in roller bearings 26, 27 relative to the said driveshaft. The circumferentially distributed differential gears 7 engaging the output gear 5 are held in through-apertures 9 between the cover 11 and a first disc element 16 and each engage at least one of the differential gears 8 which in turn engage the output gear 6. Their through-apertures 10 are axially limited by a second disc element 15 which axially is directly supported on the output gear 5. The hollow shaft 29 comprises an output pinion 30. The two hollow shafts 28, 29 are held in bearings 31, 32 in a housing 33 not shown in greater detail.

FIG. 7 shows the cross-section through the central housing portion 13 into which the centre piece 24 is either pressed or non-rotatingly inserted in some other way. The centre piece 24 may be driven by the shaft 25 to which it is non-rotatingly connected. The apertures 9 and 10 for the first and second differential gears are also identifiable.

LIST OF REFERENCE NUMBERS

| | |
|---|---|
| 1 | differential carrier |
| 2 | projection |
| 3 | projection |
| 4 | flange |
| 5 | output gear |
| 6 | output gear |
| 7 | differential gear |
| 8 | differential gear |
| 9 | aperture/recess |
| 10 | aperture/recess |
| 11 | cover |
| 12 | cover/bottom part |
| 13 | central part |
| 14 | spacer |
| 15 | disc element |
| 16 | disc element |
| 17 | through-aperture |
| 18 | recess |
| 19 | |
| 20 | shaft |
| 21 | shaft |
| 22 | |
| 23 | |
| 24 | centre piece |
| 25 | shaft |
| 26 | roller bearing |
| 27 | roller bearing |
| 28 | hollow shaft |
| 29 | hollow shaft |
| 30 | output pinion |
| 31 | bearing |
| 32 | bearing |
| 33 | housing |

We claim:
1. A differential drive with a drive housing comprising:
   a differential carrier rotatably supported in said drive housing, said differential carrier including a central bore and a plurality of parallel axis circumferential bores communicating with said central bore;
   a pair of rotatable toothed output gears postioned in said differential carrier central bore at opposite ends of said carrier;
   a first group of toothed differential gears positioned in said plurality of circumferential bores and each differential gear of said first group engaging one of said output gears;
   a second group of differential gears positioned in said plurality of circumferential bores,
   said second group of differential gears engaging the other of said output gears and each differential gear of said first group engaging a corresponding differential gear of said second group such that axial length of said circumferential bores is greater than the toothed portion of said second group and;

stop means for limiting axial length of said circumferential bores, said stop means positioned in said central bore between said output gears and including disc shaped stops extending radially outwardly into desired circumferential bores to limit the axial length of said circumferential bores and to prohibit axial movement of said at least one of said groups of differential gears, said stop means being axially supported on at least one of said output gears.

2. A differential drive according to claim 1, characterised in that the stop elements are axially held by the other output gear or parts of the carrier or spacers supported thereon.

3. A differential drive according to claim 1, characterised in that the stop elements for one group of differential gears form a common single-part annular disc member with projections engaging the apertures.

4. A differential drive according to claim 1, characterised in that the differential carrier comprises axial through-apertures for the differential gears (FIG. 1a).

5. A differential drive according to claim 1, characterised in that the differential carrier comprises unilaterally bored blind holes of identical depth for the two groups of differential gears (FIG. 1b).

6. A differential drive according to claim 1, characterised in that the differential carrier comprises unilaterally bored blind holes of different depths for the two groups of differential gears (FIG. 1c).

7. A differential drive according to claim 1, characterised in that the differential carrier comprises an axial through-aperture for the two output gears.

8. A differential drive according to claim 1, characterised in that the differential carrier, at its end, is closed by covers.

9. A differential drive according to claim 2, characterized in that the stop elements for one group of differential gears form a common single-part annular disc member with projections engaging the apertures.

10. A differential drive according to claim 2, characterized in that the differential carrier comprises axial through-apertures for the differential gears (FIG. 1a).

11. A differential drive according to claim 3, characterized in that the differential carrier comprises axial through-apertures for the differential gears (FIG. 1a).

12. A differential drive according to claim 2, characterized in that the differential carrier comprises unilaterally bored blind holes of identical depth for the two groups of differential gears (FIG. 1b).

13. A differential drive according to claim 3, characterized in that the differential carrier comprises unilaterally bored blind holes of identical depth for the two groups of differential gears (FIG. 1b).

14. A differential drive according to claim 2, characterized in that the differential carrier comprises unilaterally bored blind holes of different depths for the two groups of differential gears (FIG. 1c).

15. A differential drive according to claim 3, characterized in that the differential carrier comprises unilaterally bored blind holes of different depths for the two groups of differential gears (FIG. 1c).

16. A differential drive according to claim 2, characterized in that the differential carrier comprises an axial through-aperture for the two output gears.

17. A differential drive according to claim 3, characterized in that the differential carrier comprises an axial through-aperture for the two output gears.

18. A differential drive according to claim 4, characterized in that the differential carrier comprises an axial through-aperture for the two output gears.

19. A differential drive according to claim 5, characterized in that the differential carrier comprises an axial through-aperture for the two output gears.

20. A differential drive according to claim 6, characterized in that the differential carrier comprises an axial through-aperture for the two output gears.

21. A differential drive according to claim 2, characterized in that the differential carrier, at its ends, is closed by covers.

22. A differential drive according to claim 3, characterized in that the differential carrier, at its ends, is closed by covers.

23. A differential drive according to claim 4, characterized in that the differential carrier, at its ends, is closed by covers.

24. A differential drive according to claim 5, characterized in that the differential carrier, at its ends, is closed by covers.

* * * * *

UNITED STATES PATENT AND TRADEMARK OFFICE
CERTIFICATE OF CORRECTION

PATENT NO. : 5,122,102
DATED : June 16, 1992
INVENTOR(S) : Adrian Chludek and Wolfgang Hildebrandt It is certified that error appears in the above-indentified patent and that said Letters Patent is hereby corrected as shown below:

Item [57]

On the cover page, in the Abstract, line 9, "outer" should be --other--

Column 1, line 36, after "machining", delete ")"

Column 1, line 36, after "holes", insert --)--

Column 3, line 38, after "gear 8", insert --,--

Column 3, lines 40-41, after "distributed", insert --,--

Column 5, line 2, after "portion of", insert
--said differential gear of at least one of said first group and--

Column 5, line 38, "end" should be --ends--

Signed and Sealed this

Twelfth Day of November, 1996

Attest:

BRUCE LEHMAN

*Attesting Officer*     *Commissioner of Patents and Trademarks*